3,822,205
METHOD OF CLEARING WASTE COLORED AQUEOUS LIQUID
Saburo Oohara, Kyoto, and Kazuhiko Nakashima, Osaka, Japan, assignors to Kanebo Ltd., Tokyo, Japan
No Drawing. Filed Apr. 18, 1973, Ser. No. 352,269
Claims priority, application Japan, Apr. 25, 1972, 47/41,613; May 8, 1972, 47/45,228
Int. Cl. C02c 5/02
U.S. Cl. 210—52      12 Claims

ABSTRACT OF THE DISCLOSURE

Waste colored aqueous liquid containing non-anionic coloring substance is cleared by coagulating the non-anionic coloring substance with a coagulating agent containing condensation products of sulfonated dihydroxydiphenylsulfones or sulfonated dihydroxydiphenyls with lower aliphatic aldehydes or sulfonated condensation products of dihydroxydiphenylsulfones or dihydroxydiphenyls with lower aliphatic aldehydes, and removing the coagulated dye from the waste aqueous liquid.

---

The present invention relates to a method of clearing waste colored aqueous liquid. More particularly, the present invention relates to a method of clearing waste colored aqueous liquid containing non-anionic coloring substance with a water-soluble organic coagulating agent.

Recently, protection of the human environment from pollution due to wastes from industries has become increasingly important. Among the many kinds of such wastes it is recognized that waste colored aqueous liquid containing coloring substance such as dyes, pigments and other coloring matters frequently causes pollution of rivers, lakes, and the sea.

In order to decolorize and clear waste aqueous liquid containing a coloring substance, various methods have been attempted. For example, the waste colored aqueous liquid is treated with a coagulating agent to coagulate and precipitate the coloring substance. However, the conventional coagulating agents are unsatisfactory in coagulation of water-soluble coloring substances and colloidal coloring substances, in water, although they are effective for coagulating water-insoluble coloring substance dispersed or suspended in water. Especially, the conventional coagulating agents are practically useless for coagulating or flocculating highly water-soluble ionized dyes in water.

In order to coagulate the ionized dyes in water, it is necessary that the electric charge of the ionized dyes be completely neutralized so that the surface potential thereof is lowered. However, the conventional coagulating agents are ineffective for the neutralization because of the low ionization property thereof.

The inventors have studied the methods and coagulating agents for clearing waste colored aqueous liquids, especially, those containing highly water-soluble non-anionic coloring substances. As a result of this study, the inventors discovered a novel method and coagulating agent highly effective for coagulating, in water, not only water insoluble coloring substance but also the water-soluble cationic coloring substance such as basic dyes.

The object of the present invention is to provide a method of clearing waste colored aqueous liquid containing non-anionic coloring substance by coagulating the coloring substance.

The above-stated object can be accomplished by the method of the present invention which comprises the steps of treating a waste colored aqueous liquid containing at least one non-anionic coloring substance with a coagulating agent containing at least one organic compound selected from the class consisting of condensation products of sulfonated dihydroxydiphenylsulfones with a lower aliphatic aldehydes, sulfonated condensation products of dihydroxydiphenylsulfones with lower aliphatic aldehydes, condensation products of sulfonated dihydroxydiphenyls with lower aliphatic aldehydes, sulfonated condensation products of dihydroxydiphenyl with lower aliphatic aldehydes, and alkali metal and ammonium salts of the above-mentioned condensation products, and sulfonated condensation products, thereby coagulating said non-anionic coloring substance, and removing said coagulated non-anionic coloring substance from the waste colored aqueous liquid.

The term "non-anionic coloring substance" used herein refers to water-soluble cationic, non-ionic and ampholytic coloring substances and water-insoluble coloring substances. The non-anionic coloring substances include water-soluble and insoluble coloring substances other than water-soluble anionic coloring substances such as acid dyes, acid mordant dyes, metallized acid dyes, direct dyes and reactive dyes. More particularly, the non-anionic coloring substances include water-soluble basic dyes and water-insoluble disperse dyes, metallized disperse dyes, vat dyes, sulfur dyes and organic and inorganic pigments, and other water-insoluble natural and synthetic coloring matters. The waste colored aqueous liquid which can be cleared by the method of the present invention, may be those discharged from dyeing houses, printing houses, dye manufacturers, pigment manufacturers, paint manufacturers, food factories, cosmetic factories and leather processing factories.

The condensation products of sulfonated dihydroxydiphenyl sulfones with lower aliphatic aldehydes and the sulfonated condensation products of dihydroxydiphenylsulfones and lower aliphatic aldehydes usable as the coagulating agent for the method of the present invention, are prepared by the following procedures.

The dihydroxydiphenylsulfone is of the formula (I):

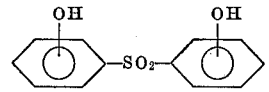

and selected from 4,4'-, 2,4'- and 2,2'-dihydroxydiphenyl-sulfones and mixtures of two or three of the above-mentioned compounds. The dihydroxydiphenylsulfones may be crude ones containing at most 30% by weight of impurities, for instance, phenol, cresol and salicylic acid. However, the crude dihydroxydiphenylsulfone including more than 30% by weight of the impurities, is not suitable as the material for the coagulating agent usable for the present invention, because it results in a low yield of the effective coagulating compound and a low effectiveness for clearing.

The dihydroxydiphenylsulfone may be sulfonated by the known sulfonation procedures, for example, using monohydrate of sulfuric acid or concentrated sulfuric acid. In the sulfonation, if it is necessary, a catalyst such as acetic acid anhydride may be used.

The dihydroxydiphenylsulfone or the sulfonated dihydroxydiphenylsulfone is condensed, in water, with a lower aliphatic aldehyde at a temperature of 60 to 105° C. in the presence of an acid catalyst consisting of, for example, acetic acid, hydrochloric acid sodium bisulfate and sodium bisulfite. The condensation may be effected in the presence of basic catalyst such as sodium hydroxide. Also, the condensation may be carried out in an organic medium. The condensation may be carried out in either a batch system or a continuous system.

The degree of condensation of the sulfonated and unsulfonated dihydroxydiphenylsulfones with the lower aliphatic aldehyde may be adjusted at will unless the resultant condensation product has insufficient clearing effect for the waste colored aqueous liquid. If the degree of condensation is very low, the resultant condensation product has a low coagulating ability. On the other hand, if the degree of condensation is very high, the resultant condensation product has a low solubility in water. Such low coagulating ability or solubility in water of the condensation product results in a poor clearing effect for the waste colored aqueous liquid.

Generally, the condensation products are preferably prepared from 1 part by mole of sulfonated or unsulfonated dihydroxydiphenylsulfone and 0.1 to 2.0 parts by mole, more preferably, 0.5 to 1.6 parts by mole, of the lower aliphatic aldehyde.

The lower aliphatic aldehyde usable for the present invention may be selected from aliphatic aldehydes having 1 to 4 carbon atoms, particularly, formaldehyde, acetaldehyde, propionaldehydes and butylaldehydes. The formaldehyde may be polymerized into the form of paraformaldehyde.

The condensation product of the dihydroxydiphenylsulfone with the lower aliphatic aldehyde is sulfonated by the same method as that for the dihydroxydiphenylsulfone itself.

The condensation products of sulfonated dihydroxydiphenyls with lower aliphatic aldehydes and the sulfonated condensation products of dihydroxydiphenyls with lower aliphatic aldehydes usable as the coagulating agent for the method of the present invention, is prepared by the procedures detailed below.

The dihydroxydiphenyl usable for the present invention is of the formula (II):

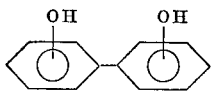

and selected from 4,4'-, 2,2'- and 2,4'-dihydroxydiphenyls and mixtures of two or three of the above-mentioned compounds. The dihydroxydiphenyls may be crude materials containing 30% or less of impurities such as phenol, cresol and salicyclic acid. However, the crude material containing more than 30% of impurities is unusable as a material for the present invention. Such crude materials results in a coagulation agent having a low clearing effect.

The dihydroxydiphenyls can be sulfonated by the conventional sulfonation methods, for example, using, as a sulfonating agent, monohydrate of sulfuric acid or concentrated sulfuric acid. If it is necessary, a catalyst for the sulfonation may be used. The catalyst may be selected from acetic acid anhydride.

The dihydroxydiphenyl or sulfonated dihydroxydiphenyl is condensed, in water, or an organic medium, with a lower aliphatic aldehyde at a temperature of 60 to 105° C. in the presence of an acid catalyst, for example, acetic acid, hydrochloric acid, sodium bisulfate and sodium bisulfite, or a basic catalyst, for example, sodium hydroxide. The condensation may be effected in either a batch system or a continuous system.

The degree of condensation of the sulfonated and unsulfonated dihydroxydiphenyl with the lower aliphatic aldehyde may be adjusted at will unless the resultant coagulating agent has insufficient clearing effect for the waste colored aqueous liquid.

Generally, the condensation products is preferably prepared from 1 part by mole of sulfonated or unsulfonated dihydroxydiphenyl and 0.1 to 1.8 parts by mole, more preferably, 0.4 to 1.6 parts by mole, of the lower aliphatic aldehyde. If the lower aliphatic aldehyde is in an amount of less than 0.1 parts by mole, the resultant product has a low coagulating ability. Also, if the lower aliphatic aldehyde is in a quantity of more than 1.6 parts by mole, the resultant product has a low solubility in water. Such low coagulating ability and solubility result in a poor clearing effect for the waste colored aqueous liquid.

The lower aliphatic aldehyde usable for the present invention is preferably selected from aliphatic aldehydes having 1 to 4 carbon atoms, particularly, formaldehyde, acetaldehyde, propionaldehydes and butylaldehydes. The formaldehyde may be polymerized into the form of paraformaldehyde.

The condensation product of the dihydroxydiphenyl with the lower aliphatic aldehyde is sulfonated by the same method as that for the dihydroxydiphenyl itself.

The above-stated condensation products and sulfonated condensation products may be converted to alkali metal salts or ammonium salts thereof which are water-soluble. Such salts are prepared by treating in water, the condensation products or the sulfonated condensation products with sodium hydroxide, potassium hydroxide, sodium carbonate, potassium carbonate, ammonia, ammonium chloride, ammonium formate, ammonium acetate, ammonium sulfate and ammonium nitrate, which are used in an amount of 5 to 200% based on the weight of the condensation products or the sulfonated condensation product.

The coagulating agents of the present invention are used in an amount determined in response to the amount of the non-anionic coloring substance contained in the waste colored aqueous liquid. The amount of the coagulating agent to be used for clearing is preferably determined by a preliminary test. Generally, the coagulating agents of the present invention are used in an amount of 10 to 200% based on the weight of the non-anionic coloring substance contained in the waste colored aqueous liquid. For example, the waste colored aqueous liquid containing about 100 p.p.m. of the nonanionic coloring substance can be almost perfectly cleared by using 10 to 50 p.p.m. of the coagulating agent of the present invention. Preferably, the coagulating agent is dissolved in water, in a concentration of 1 to 30% by weight, previous to adding it into the waste colored aqueous liquid.

The coagulating treatment of the present invention is preferably effected for the waste colored aqueous liquid at a pH of 6.0 to 8.0, more preferably, 6.5 to 7.5.

The coagulating agent of the present invention is effective for clearing the waste colored aqueous liquid even when it is used alone. Also, the coagulating agent of the present invention may be used together with one or more conventional coagulating agents, for example, aluminium sulfate, polyaluminium chloride of the formula:

$$(Al_2(OH)_nCl_{6-n})_m$$

ferric and ferrous chlorides, ferric and ferrous sulfates and polyacrylamides. The above-stated conventional coagulating agents are effective for coagulating water-insoluble materials dispersed or suspended in water.

The following examples are cited to illustrate the practice of this invention and are not intended to limit the scope thereof. In the examples, all parts and percents referred to are parts and percents by weight.

EXAMPLE 1

Condensation product of sulfonated 4,4'-dihydroxydiphenylsulfone with formaldehyde A mixture of 100 parts of 4,4' - dihydroxydiphenylsulfone and 55 parts of acetic acid anhydride was charged into a reaction vessel of 500 ml. capacity with a stirrer and reflux condenser, stirred, and then mixed with 55 parts of monohydrate of sulfuric acid. The reaction mixture was heated at a temperature of 100 to 102° C. for 5 hours to sulfonate the 4,4'-dihydroxydiphenyl sulfone. After completing the sulfonation, 20 parts of water was added to the reaction mixture to hydrolyze the acetic acid anhydride to acetic acid. The resultant sulfonated 4,4'-dihydroxydiphenylsulfone was isolated by removing acetic acid from the reaction mixture. The resultant sulfonated 4,4' - dihydroxydiphenylsulfone was condensed with 40 parts of an aqueous solution containing 30% of formaldehyde at a temperature of 103 to 105° C. for 4.5 hours. After completing the condensation, the condensation product was treated with 50 parts of an aqueous solution of 50% of sodium hydroxide and converted to a water soluble sodium salt. The resultant salt was dried.

The resultant water-soluble sodium salt of the condensation product was used as a coagulating agent for clearing aqueous liquids containing basic dyes or disperse dyes in the following manner.

The coagulating agent was dissolved in water in a concentration of 1%. Four commercial dyes as indicated in Table 1 were dissolved or dispersed separately from each other in water in a concentration of 100 p.p.m.

The coagulating agent was added to the dye liquids in a concentration of 50 p.p.m. and aluminium sulfate which is a conventional coagulating agent was further added in a concentration of 150 p.p.m.

The dye liquids were stirred using a rotating stirrer at a high rotation velocity of 180 r.p.m. for 1 minute and, thereafter, at a low velocity of 60 r.p.m. for 5 minutes to flocculate the dyes. The flocks of the dyes thusly formed were separated from water by filtering using a filter paper.

The clearing treatment as stated above was carried out at a pH of 6.5 to 7.0 which was adjusted by adding 10 to 80 p.p.m. of calcium hydroxide to the dye liquids.

For comparison, the same dye liquids as those used in the present example were treated by 150 p.p.m. of aluminium sulfate alone under the same pH as that stated above.

The clearing effect of the coagulating agent on the dye liquid is expressed by a ratio in percent of a weight of dye removed from the dye liquid with respect to the initial weight of the dye in the dye liquid.

The results are indicated in Table 1.

TABLE 1

| Dye | | Clearing effect (percent) | |
| --- | --- | --- | --- |
| Class | Name | Example 1 | Comparison Example |
| Basic dye | Diacryl Brilliant Blue 2B-E [1] | 99.5 | 10.5 |
| | Basacryl Red X BL [2] | 98.0 | 8.0 |
| Disperse dye | Palanil Scarlet RR [3] | 100 | 64.0 |
| | Miketon Polyester Brown G [4] | 100 | 72.0 |

[1] Trademark of basic dye produced by Mitsubishi Kasei, Japan.
[2] Trademark of basic dye produced by BASF, Germany.
[3] Trademark of disperse dye produced by BASF, Germany.
[4] Trademark of disperse dye produced by Mitsui Toatsu Kagaku, Japan.

As Table 1 clearly shows, the conventional inorganic flocculating agent, namely aluminium sulfate, has a very low clearing effect for the basic dyes which are cationic highly water-soluble dyes, and a relatively low effect for the disperse dyes which are non-ionic water-insoluble dyes. Compared with this, the coagulating agent of the present invention can almost perfectly clear either the basic dye solutions or the disperse dye dispersions. Broadly speaking, it is very difficult to perfectly clear the colored solution containing the basic dye. However, such difficulty can be completely eliminated by using the coagulating agent of the present invention.

EXAMPLE 2

The same coagulating agent as that of Example 1 was used at a concentration of 50 p.p.m. to clear three kinds of waste colored aqueous liquids produced in dyeing houses. One of the waste liquids contained a red basic dye for acrylic fibers in a concentration 165 p.p.m.; another one a brown disperse dye for polyethylene terephthalate fibers in a concentration of 200 p.p.m., and; still another one a reddish orange basic dye for silk in a concentration of 140 p.p.m. The above dye liquids further contained one or more dyeing additives such as leveling agent, retardant, and promoter, namely, sodium acetate, sodium sulfate and cationic, anionic, non-ionic and ampholytic surface active agents.

For comparison, the same procedures were repeated using aluminium sulfate as the conventional coagulating agent in a concentration of 150 p.p.m. The results are shown in Table 2.

TABLE 2

| Waste colored liquid | | | Clearing effect (percent) | |
| --- | --- | --- | --- | --- |
| Fiber dyed | Dye | Concentration (p.p.m.) | Ex. 2 | Comparison Example |
| Acrylic fiber | Red basic dye | 165 | 99 | 5 |
| Polyester fiber | Brown disperse dye | 200 | 100 | 55 |
| Silk | Reddish orange basic dye | 140 | 98 | 3 |

Table 2 clearly shows that the coagulating agent is extremely effective for clearing the waste colored liquid discharged from the dyeing houses. In view of the results of Examples 1 and 2, the effectiveness of the coagulation agent of the present invention does not depend on the color of the waste liquid.

EXAMPLE 3

A coagulating agent was prepared by the following procedures. A mixture of 65 parts of 4,4' - dihydroxydiphenylsulfone, 35 parts of 2,4'-dihydroxydiphenylsulfone and 50 parts of acetic acid anhydride was stirred. To the mixture was added dropwise 45 parts of monohydrate of sulfuric acid. The reaction mixture prepared above was heated at a temperature of 98 to 100° C. for 5 hours and, thereafter, approximately 20 parts of water was added to hydrolyze acetic acid anhydride to acetic acid. The resultant sulfonated mixture of 4,4'- and 2,4'-dihydroxydiphenylsulfones was isolated by removing acetic acid from the reaction mixture. The sulfonated mixture was condensed with 50 parts of 30% aqueous solution of formaldehyde at a temperature of 102 to 105° C. for 4.5 hours. After completing the condensation reaction, the condensation product was treated with 50 parts of 40% aqueous solution of ammonium sulfate to convert it to a mixture of ammonium salts of the condensation products. The resultant ammonium salt mixture was separated from water and dried. The dried ammonium salt mixture was used as a coagulating agent for clearing the waste colored aqueous liquid.

A waste blue aqueous liquid discharge from a pigment manufacturing factory and containing approximately 200 p.p.m. of a blue pigment, was treated with a mixture of 30 p.p.m. of the coagulating agent as prepared above, 500 p.p.m. of ferric sulfate and 150 p.p.m. of slaked lime at a pH of 6.0 to 7.0. The clearing effect was practically 100%. For comparison, the same clearing treatment as stated above was repeated using a mixture of 500 p.p.m. of ferric sulfate and 150 p.p.m. of slaked lime. In such a case, the clearing effect was about 70 to 80%, and the treated liquid was considerably blue.

EXAMPLE 4

The same condensation procedures as those of Example 1 were repeated three times using 0.2, 0.5 and 1.5 mole of formaldehyde with respect to 1 mole of sulfonated 4,4'-dihydroxydiphenylsulfone to prepare three kinds of the coagulating agents of the present invention. The coagulating agents were employed in a concentration of 50 p.p.m. to clear an aqueous solution containing 100 p.p.m. of Sumiacryl Brilliant Red 4G (trademark of a basic dye for acrylic fiber made by Sumitomo Kagaku, Japan).

For comparison, the same clearing procedure as stated above was repeated twice using 50 p.p.m. of sulfonated 4,4'-dihydroxydiphenylsulfone and condensation products prepared using 2.1 mole of formaldehyde with respect to 1 mole of the sulfonated 4,4'-dihydroxydiphenylsulfone.

For further comparison, the same clearing procedure as stated above was repeated using 150 p.p.m. of aluminium sulfate.

The results are shown in Table 3.

TABLE 3

| | Mole number of formaldehyde used | Clearing effect (percent) |
|---|---|---|
| Example 4 | 0.2 | 22.0 |
| | 0.5 | 83.0 |
| | 1.5 | 98.5 |
| Comparison Example | 0 | 6.0 |
| | 2.1 | 7.5 |
| Aluminium sulfate only | | 4.5 |

Table 3 shows that in a range from 0.2 to 1.5 mole of formaldehyde used for preparing the condensation products, the larger the mole number of formaldehyde, the higher the clearing effect for the basic dye aqueous solution. Particularly, the condensation products prepared using 0.5 to 1.5 mole of formaldehyde with respect to 1 mole of the sulfonate 4,4'-dihydroxydiphenylsulfone, are extremely effective for the clearing. The comparison condensation product prepared using more than 2.0 mole of formaldehyde has a relatively low clearing effect, because the condensation product was dissolved only slightly in water. The sulfonated 4,4'-dihydroxydiphenylsulfone and the aluminium sulfate had a very low clearing effect for the highly water-soluble basic dye.

EXAMPLES 5 AND 6

In Example 5, the same preparation procedures of the condensation product as those of Example 1 were repeated except that 100 parts of a crude 4,4'-dihydroxydiphenylsulfone containing 20% of salicylic acid and 14 parts of acetaldehyde were used. The condensation product was utilized in a concentration of 50 p.p.m. to clear an aqueous dispersion of 250 p.p.m. of Dianix Fast Black R-FS (trademark of a disperse dye made by Mitsubishi Kasei, Japan). For Example 6, the same procedures as those of Example 5 were repeated using 100 parts of pure 4,4'-dihydroxydiphenylsulfone. The results are shown in Table 4.

TABLE 4

| Example No.: | Clearing effect (percent) |
|---|---|
| 5 | 99.5 |
| 6 | 100.0 |

The clearing effect in Example 5 was practically the same as that of Example 6. That is, the crude 4,4'-dihydroxydiphenylsulfone containing 20% of salicylic acid had similar utility for the coagulating agent as that of the pure one. However, it should be noted that more than 30% of impurity of the dihydroxydiphenylsulfone causes a poor clearing effect of the condensation product prepared therefrom.

EXAMPLE 7

Sulfonated condensation product of 4,4'-dihydroxydiphenylsulfone with formaldehyde A reaction vessel of 500 ml. capacity with a stirrer and reflux condenser was charged with 100 parts (0.25 mole) of 4,4'-dihydroxydiphenylsulfone, 15 parts of sodium hydroxide and 200 parts of water, and the mixture was heated with stirring to prepare a uniform solution. 20.3 parts (0.25 mole) of a 37% aqueous solution of formaldehyde were added dropwise to the solution with stirring. The reaction mixture thus prepared was heated at a temperature of 101° C. for 3 hours and, thereafter, allowed to cooled to a room temperature, whereby 4,4'-dihydroxydiphenylsulfone was primarily condensed with formaldehyde.

To the primary condensation product was added dropwise 23 parts of a concentrated sulfuric acid of more than 98% concentration.

After completing the addition, the reaction mixture was heated at a temperature of 101° C. for 2 hours at a pH lower than 1.0 to sulfonate the primary condensation product, allowed to cool to a temperature of 60 to 80° C. and then neutralized by adding 21 parts of sodium hydroxide. The resultant product was a brown liquid substance. A mixture of 19 parts of sodium bisulfite, 15 parts of a 37% aqueous solution of formaldehyde and 15 parts of water was added to the sulfonation product with stirring and the mixture was heated at a temperature of 98° C. for 30 hours to condense the sulfonated product a second time with formaldehyde. The resultant product was a brownish black viscous substance.

The same clearing procedure as that of Example 1 was repeated for clearing an aqueous solution containing 100 p.p.m. of Sumiacryl Red G (trademark of a basic dye produced by Sumitomo Kagaku, Japan) using 50 p.p.m. of the above-prepared sulfonated condensation product as a coagulating agent. The clearing effect was 98.5%. For comparison, the same dye solution as stated above was treated with 150 p.p.m. of aluminium sulfate. The clearing effect was 12.0%.

EXAMPLE 8

The same procedures as those of Example 7 were repeated except that acetaldehyde was used instead of formaldehyde. As a result of clearing treatment, the clearing effect was 89.0%.

EXAMPLE 9

The same procedures as those of Example 7 were repeated except that propionaldehyde was used instead of formaldehyde. As a result of clearing treatment, the clearing effect was 82.0%.

EXAMPLE 10

The same procedures as those of Example 7 were repeated except that n-butylaldehyde was used instead of formaldehyde. The clearing effect was 80.5%.

EXAMPLE 11

Condensation product of sulfonated 2,2'-dihydroxydiphenyl with formaldehyde 100 parts of 2,2'-dihydroxydiphenyl were mixed with 45 parts of acetic acid anhydride in a reaction vessel of 500 ml. with a stirrer and reflux condenser, and 50 parts of monohydrate of sulfuric acid was gradually added to the mixture. The reaction mixture was heated at a temperature of 98° C. to 100° C. for 6 hours to sulfonate 2,2'-dihydroxydiphenyl. After completing the sulfonation, 20 parts of distilled water was added to the reaction mixture to hydrolyze acetic acid anhydride to acetic acid. The sulfonated 2,2'-dihydroxydiphenyl was isolated by removing acetic acid from the reaction mixture. The resultant sulfonated 2,2'-dihydroxydiphenyl was mixed with 35parts of an aqueous solution containing 30% of formaldehyde and the mixture was heated at a temperature of 103 to 105° C. for 4.5 hours to produce a condensation product of the sulfonated 2,2'-dihydroxydiphenyl with formaldehyde. The condensation product was converted to a watersoluble ammonium salt thereof by adding 65 parts of an aqueous solution containing 50% of ammonium sulfate. Thereafter, the product was distilled to remove water, dried and reduced to powder. The resultant brown ammonium salt of the conddensation product was used as a coagulating agent. The coagulating agent was dissolved in water in a concentration of 1%.

Three kinds of commercial dyes as shown in Table 5 were dissolved or dispersed separately in water in a concentration of 100 p.p.m. The dye aqueous liquids were adjusted to a pH of 6.5 to 7.0 by adding a necessary amount of slaked lime. To each dye liquid was added 50 p.p.m. of the coagulating agent prepared above and 150 p.p.m. of aluminium sulfate. Each mixture was stirred using a rotating stirrer at a high rotation velocity of 180 r.p.m. for 1 minute, then at a low velocity of 60 r.p.m. for 10 minutes and, thereafter, allowed to coagulate the dye. The coagulated dye was filtered by a filter paper.

For comparison, the same treatment as stated above was repeated using 150 p.p.m. of aluminium sulfate alone.

The results are shown in Table 5.

TABLE 5

| Dye | | Clearing effect (percent) | |
|---|---|---|---|
| Class | Name | Example 10 | Comparison example |
| Basic dye | Nichilon Navy Blue KG [1] | 97.5 | 7.0 |
| Disperse dye | Resoline Blue FBL [2] | 100 | 66.5 |
| Metallized disperse dye | Lanyl Red GG [3] | 99.0 | 41.5 |

[1] Trademark of a basic dye made by Nissei Kasei, Japan.
[2] Trademark of a disperse dye made by Bayer, Germany.
[3] Trademark of a metallized dye made by Sumitomo Kagaku, Japan.

In view of Table 5, the conventional coagulating agent, aluminium sulfate, had a very low effectiveness for clearing the highly water-soluble basic dye. The coagulating agent of the present example had a high clearing effect not only for the water-insoluble disperse and metallized dyes but also for the basic dye.

EXAMPLE 12

The same coagulating agent as that of Example 11 was used to clear four kinds of waste colored aqueous liquids discharged from dyeing houses. The waste colored aqueous liquids contained the dyes in the concentrations as shown in Table 6.

The waste colored aqueous liquids were cleared by the same procedure as that of Example 11. For comparison, the same waste colored liquids were treated by 150 p.p.m. of aluminium sulfate alone.

The results are shown in Table 6.

TABLE 6

| Material dyed | Dye | Concentration of dye (p.p.m.) | Clearing effect (percent) | |
|---|---|---|---|---|
| | | | Ex. 12 | Comparison example |
| Acrylic fiber | Basic dye (violet) | 130 | 99 | 8 |
| Polyester fiber | Disperse dye (brown) | 200 | 100 | 55 |
| Silk | Basic dye (yellowish brown) | 145 | 98 | 6 |
| Blend of polyester fiber and wool | Mixture of disperse dye and metallized dye | ca. 150 | 100 | 72 |

All the waste colored liquids included at least one dyeing additive such as leveling agent, retardant and promotor, namely, sodium acetate, sodium sulfate and surface active agents, other than the dyes.

Table 6 shows that the coagulating agent of the present invention is highly effective for clearing the waste colored liquid containing not only water-insoluble non-ionic disperse and metallized dyes but also that containing highly water-soluble cationic basic dyes.

EXAMPLE 13

A coagulating agent was produced by the following procedures. A mixture of 75 parts of 4,4'-dihydroxydiphenyl and 25 parts of 2,4'-dihydroxydiphenyl was mixed with 50 parts of acetic acid anhydride with stirring. 50 parts of monohydrate of sulfuric acid were gradually added to to mixture, and the reaction mixture thus prepared was heated at a temperature of 98 to 100° C. for 3.5 hours to sulfonate the mixed dihydroxydiphenyls. After completing the sulfonation, 20 parts of distilled water were added to the reaction mixture to hydrolyze acetic acid anhydride to acetic acid. The resultant sulfonated compounds were separated from the reaction mixture by removing acetic acid.

The separated sulfonated compounds were mixed with 55 parts of an aqueous solution of 30% of acetaldehyde, and the mixture was heated at a temperature of 102 to 105° C. for 5 hours to condense the sulfonated compounds with acetaldehyde. The condensed compound mixture was treated with 50 parts of an aqueous solution of 50% of sodium hydroxide, to convert it to a water-soluble sodium salt mixture, and this was followed by distillation of water. The resultant mixture was of brownish black.

The sodium salt mixture as prepared above was used as a coagulating agent for clearing a waste colored aqueous dispersion discharged from a pigment manufacturing factory and containing approximately 200 p.p.m. of a blue pigment. The waste colored dispersion was treated with a blend containing 40 p.p.m. of the sodium salt mixture of the sulfonated condensation products as stated above, 500 p.p.m. of ferric sulfate and 150 p.p.m. of slaked lime, and the treated dispersion was filtered. In this case, the clearing effect was practically 100%.

For comparison, the same waste colored dispersion as stated above was treated with 500 p.p.m. of ferric sulfate and 150 p.p.m. of slaked lime. The clearing effect was approximately 70 to 80%. The filtered liquid was considerably blue.

EXAMPLE 14

The same condensation procedures as those of Example 11 were repeated three times using 0.2, 0.5 and 1.5 mole of formaldehyde with respect to 1 mole of sulfonated 4,4'-dihydroxydiphenyl to prepare three kinds of the coagulating agents. The resultant coagulating agents were utilized in a concentration of 50 p.p.m. to clear an aqueous solution of 100 p.p.m. of Diacryl Brilliant Blue 2B-F (trademark of a basic dye for acrylic fibers made by Mitsubishi Kasei, Japan) in the same clearing procedure as that of Example 1.

For comparison, the same clearing procedure as stated above was repeated twice using 50 p.p.m. of sulfonated 4,4'-dihydroxydiphenyl and a condensation product prepared from 1 mole of sulfonated 4,4'-dihydroxydiphenyl and 1.9 mole of formaldehyde.

For further comparison, the same clearing procedure as stated above was repeated using 150 p.p.m. of aluminium sulfate.

The results are shown in Table 7.

TABLE 7

| | Mole number of formaldehyde used | Clearing effect (percent) |
|---|---|---|
| Example 4 | 0.2 | 37.5 |
| | 0.5 | 86.0 |
| | 1.5 | 99.5 |
| Comparison example | 0 | 9.0 |
| | 1.9 | 12.0 |
| Aluminium sulfate only | | 10.5 |

Table 7 shows that the coagulating agents of the present invention had higher clearing effects than those of other coagulating agents. Particularly, the condensation products prepared from 0.5 to 1.5 mole of formaldehyde with respect to 1 mole of the sulfonated 4,4'-dihydroxydiphenyl, had excellent clearing effectiveness. However, the sulfonated 4,4'-dihydroxydiphenyl itself and the condensation product prepared using 1.9 mole of formaldehyde which was insoluble in water had a lower clearing effectiveness, respectively.

EXAMPLES 15 AND 16

For Example 15, the same sulfonation and condensation procedures as those of Example 11 were repeated except that a crude, 4,4'-dihydroxydiphenyl containing 20% of phenol were used instead of the 2,2'dihydroxydiphenyl. The condensation product was utilized in a concentration of 50 p.p.m. to clear the same aqueous dispersion as that of Example 5.

For Example 16, the same procedures as stated above were repeated using pure 4,4'-dihydroxydiphenyl.

The results of Examples 15 and 16 are indicated in Table 8.

TABLE 8

| Example No.: | Clearing effect (percent) |
|---|---|
| 15 | 99.0 |
| 16 | 100.0 |

In view of Table 8, it appears that the crude 2,2'-dihydroxydiphenyl containing 20% of phenol had practically the same utility for the coagulating agent as that of the pure one. However, generally, it is undesirable that the crude dihydroxydiphenyl contains more than 30% of impurity. Such a high impurity results in a poor clearing effect of the resultant condensation product.

What we claim is:

1. A method of clearing waste colored aqueous liquid comprising the steps of treating at a pH of 6.0 to 8.0, a waste colored aqueous liquid containing at least one non-anionic coloring substance selected from the group consisting of water-soluble cationic, non-ionic and ampholytic coloring substances and water-insoluble coloring substances, by adding an amount of 10 to 200% based on the weight of the non-anionic coloring substance in said waste colored liquid of a coagulating agent containing at least one organic compound selected from the class consisting of condensation products of sulfonated dihydroxydiphenylsulfones with a lower aliphatic aldehydes, sulfonated condensation products of dihydroxydiphenylsulfones with lower aliphatic aldehydes, condensation products of sulfonated dihydroxydiphenyls with lower aliphatic aldehydes, sulfonated condensation products of hihydroxydiphenyl with lower aliphatic aldehydes, and alkali metal and ammonium salts of the above-mentioned condensation products and sulfonated condensation products, thereby coagulating said non-anionic coloring substance, and removing said coagulated non-anionic coloring substance from the waste colored aqueous liquid.

2. A method as claimed in claim 1, wherein said lower aliphatic aldehyde has 1 to 4 carbon atoms.

3. A method as claim in claim 2, wherein said lower aliphatic aldehyde is selected from the group consisting of formaldehyde, acetaldehyde, propionaldehydes, butylaldehydes.

4. A method as claimed in claim 1, wherein said sulfonated dihydroxydiphenylsulfone is selected from the group consisting of sulfonated 4,4'-, 2,4'- and 2,2'-dihydroxydiphenylsulfones.

5. A method as claimed in claim 1, wherein said dihydroxydiphenylsulfone is selected from the group consisting of 4,4'-, 2,4'- and 2,2'-dihydroxydiphenylsulfones.

6. A method as claimed in claim 1, wherein said condensation product of sulfonated dihydroxydiphenylsulfone with lower aliphatic aldehyde is prepared from 1 part by mole of said sulfonated dihydroxydiphenylsulfone and 0.1 to 2.0 parts by mole of said lower aliphatic aldehyde.

7. A method as claimed in claim 1, wherein said sulfonated condensation product of dihydroxydiphenylsulfone with lower aliphatic aldehyde is prepared from 1 part by mole of said dihydroxydiphenylsulfone and 0.1 to 2.0 parts by mole of said lower aliphatic aldehyde.

8. A method as claimed in claim 1, wherein said sulfonated dihydroxydiphenyl is selected from the group consisting of sulfonated 4,4'-, 2,4'- and 2,2'-dihydroxydiphenyls.

9. A method as claimed in claim 1, wherein said dihydroxydiphenyl is selected from the group consisting of 4,4',- 2,4- and 2,2'-dihydroxydiphenyls.

10. A method as claimed in claim 1, wherein said condensation product of sulfonated dihydroxydiphenyl with lower aliphatic aldehyde is prepared from 1 part by mole of said sulfonated dihydroxydiphenyl and 0.1 to 1.8 parts by mole of said lower aliphatic aldehyde.

11. A method as claimed in claim 1, wherein said sulfonated condensation product of dihydroxydiphenyl with lower aliphatic aldehyde is prepared from 1 part by mole of said dihydroxydiphenyl and 0.1 to 1.8 parts by mole of said lower aliphatic aldehyde.

12. A method as claimed in claim 1, wherein said coagulating agent is used together with at least one conventional coagulating agent selected from the group consisting of aluminium sulfate, polyaluminium chloride, ferric and ferrous chlorides, ferric and ferrous sulfates and polyacrylamide compounds.

References Cited

UNITED STATES PATENTS 3,736,255    5/1973    Ghassemi et al. _____ 210—52
3,308,102    3/1967    Wilson.

FRANK A. SPEAR, Jr., Primary Examiner

B. CASTEL, Assistant Examiner

U.S. Cl. X.R.

8—102, 141; 210—54